(12) United States Patent
Liu et al.

(10) Patent No.: US 6,398,125 B1
(45) Date of Patent: Jun. 4, 2002

(54) PROCESS AND APPARATUS FOR THE PRODUCTION OF NANOMETER-SIZED POWDERS

(75) Inventors: Junhai Liu; Bor Zeng Jang, both of Auburn, AL (US)

(73) Assignee: Nanotek Instruments, Inc., Opelika, AL (US)

( * ) Notice: Subject to any disclaimer, the term of this patent is extended or adjusted under 35 U.S.C. 154(b) by 0 days.

(21) Appl. No.: 09/780,598

(22) Filed: Feb. 10, 2001

(51) Int. Cl.[7] .......................... B05B 1/24; B05B 17/04; A62C 5/02
(52) U.S. Cl. ................. 239/13; 239/8; 239/9; 239/10
(58) Field of Search .................... 239/13, 1, 3, 8, 239/9, 10, 135; 75/336, 345, 346, 331, 338

(56) References Cited

U.S. PATENT DOCUMENTS

| | | | |
|---|---|---|---|
| 3,988,084 A | 10/1976 | Esposito et al. | |
| 4,282,195 A | 8/1981 | Hoekje | |
| 4,376,740 A * | 3/1983 | Uda et al. | 264/10 |
| 4,490,162 A | 12/1984 | Davis | |
| 4,585,473 A | 4/1986 | Narasimhan | |
| 4,662,909 A | 5/1987 | Durr | |
| 4,732,369 A * | 3/1988 | Araya et al. | 266/207 |
| 4,793,853 A | 12/1988 | Kale | |
| 4,952,144 A * | 8/1990 | Hansz et al. | 425/10 |
| 5,125,574 A | 6/1992 | Anderson et al. | |
| 5,294,242 A * | 3/1994 | Zurecki et al. | 75/345 |
| 5,358,695 A * | 10/1994 | Helble et al. | 423/592 |
| 5,656,061 A | 8/1997 | Miller et al. | |
| 5,788,738 A * | 8/1998 | Pirzada et al. | 75/331 |
| 5,863,618 A | 1/1999 | Tarosinski | |

* cited by examiner

Primary Examiner—William C. Doerrler
Assistant Examiner—Davis Hwu

(57) ABSTRACT

A two-stage process and apparatus for producing nanometer-scaled powders from a metal, the process including (a) operating a first-stage heating and atomizing device to provide a stream of super-heated fine-sized metal liquid droplets into a chamber of a second-stage atomizing device; (b) operating this second-stage atomizing device by directing an atomizing fluid medium to impinge upon the stream of super-heated metal liquid droplets to further break up the metal liquid droplets into substantially nanometer-sized particles; and (c) cooling these particles to form nanometer-sized solid powders. The first-stage heating and atomizing device preferably includes a twin-wire arc spray device. The second-stage atomizing device preferably includes a vortex jet nozzle.

25 Claims, 8 Drawing Sheets

PROCESS AND APPARATUS FOR THE PRODUCTION OF NANOMETER-SIZED POWDERS

The present invention is a result of a research sponsored by the SBIR Program of U.S. National Science Foundation. The U.S. government has certain rights on this invention.

FIELD OF THE INVENTION

The present invention relates to a process and apparatus for producing ultra fine metal and ceramic particles, and more particularly, it relates to a process and apparatus for producing nanometer-sized metal and ceramic particles at a high production rate.

BACKGROUND

The interest in nanometer-sized particles or clusters (d<200 nm) is due to the unique processing characteristics as well as performance properties exhibited by small particles of metals, semiconductors and ceramics. Ultra-fine particles have enormous potential in metal and ceramic processing. For example, smaller particles can be sintered at much lower temperatures. Not only the structure, but also the mechanical, electronic, optical, magnetic and thermal properties of nano-crystalline materials are different from those exhibited by their bulk counterparts. Nano-phase metals and ceramics derived from nanometer-scaled particles are known to exhibit unique physical and mechanical properties. The novel properties of nano-crystalline materials are the result of their small residual pore sizes (small intrinsic defect sizes), limited grain size, phase or domain dimensions, and large fraction of atoms residing in interfaces. Specifically, ceramics fabricated from ultra-fine particles are known to possess high strength and toughness because of the ultra-small intrinsic defect sizes and the ability for grain boundaries to undergo a large plastic deformation. In a multi-phase material, limited phase dimensions could imply a limited crack propagation path if the brittle phase is surrounded by ductile phases so the cracks in a brittle phase would not easily reach a critical crack size. In addition, dislocation movement distances in a metal could be limited in ultra fine metallic domains, leading to unusually high strength and hardness. Even with only one constituent phase, nano-crystalline materials may be considered as two-phase materials, composed of distinct interface and crystalline phases. Further, the possibilities for reacting, coating, and mixing various types of nano materials create the potential for fabricating new composites with nanometer-sized phases and novel properties.

For a review on nano-phase materials please refer to R. P. Andres, et al. "Research Opportunities on Clusters and Cluster-Assembled Materials," in Journal of Materials Research, Vol. 4, 1989, pp. 704–736 and A. N. Goldstein, "Handbook of Nanophase Materials," Marcel Dekker, Inc., New York, 1997. The techniques for the generation of nanometer-sized particles may be divided into three broad categories: vacuum, gas-phase, and condensed-phase synthesis. Vacuum synthesis techniques include sputtering, laser ablation, and liquid-metal ion sources. Gas-phase synthesis includes inert gas condensation, oven sources (for direct evaporation into a gas to produce an aerosol or smoke of clusters), laser-induced vaporization, laser pyrolysis, and flame hydrolysis. Condensed-phase synthesis includes reduction of metal ions in an acidic aqueous solution, liquid phase precipitation of semiconductor clusters, and decomposition-precipitation of ionic materials for ceramic clusters. Other methods include high-energy milling, mix-alloy processing, chemical vapor deposition (CVD), and sol-gel techniques.

All of these techniques have one or more of the following problems or shortcomings:

(1) Most of these prior-art techniques suffer from a severe drawback: extremely low production rates. It is not unusual to find a production rate of several grams a day. Vacuum sputtering, for instance, only produces small amounts of particles at a time. Laser ablation and laser-assisted chemical vapor deposition techniques are well-known to be excessively slow processes. The high-energy ball milling method, known to be a "quantity" process, is capable of producing only several kilograms of nano-scaled powders in approximately 100 hours. These low production rates, resulting in high product costs, have severely limited the utility value of nano-phase materials. There is, therefore, a clear need for a faster, more cost-effective method for preparing nanometer-sized powder materials.

(2) Condensed-phase synthesis such as direct reaction of metallic silicon with nitrogen to produce silicon nitride powder requires pre-production of metallic silicon of high purity in finely powdered form. This reaction tends to produce a silicon nitride powder product which is constituted of a broad particle size distribution. Furthermore, this particular reaction does not yield a product powder finer than 100 nm (nanometers) except with great difficulty. Due to the limited availability of pure metallic silicon in finely powdered form, the use of an impure metallic powder necessarily leads to an impure ceramic product. These shortcomings are true of essentially all metallic elements, not just silicon.

(3) Some processes require expensive precursor materials to ceramic powders and could result in harmful gas that has to be properly disposed of. For instance, the reaction scheme of $3SiCl_4 + 4NH_3 = Si_3N_4 + 12HCL$ involves the utilization of expensive $SiCl_4$ and produces dangerous HCl gas.

(4) Most of the prior-art processes are capable of producing a particular type of ceramic powder at a time, but do not permit the preparation of a uniform mixture of two or more types of nano-scaled ceramic powders at a predetermined proportion.

(5) Most of the prior-art processes require heavy and/or expensive equipment (e.g., a high power laser source or a plasma generator), resulting in high production costs. In the precipitation of ultra fine particles from the vapor phase, when using thermal plasmas or laser beams as energy sources, the particle sizes and size distribution cannot be precisely controlled. Also, the reaction conditions usually lead to a broad particle size distribution as well as the appearance of individual particles having diameters that are multiples of the average particle size.

(6) The conventional mechanical attrition and grinding processes have the disadvantages that powders can only be produced up to a certain fineness and with relatively broad particle-size distribution. As a matter of fact, with the currently familiar large-scale process for manufacturing powders it is rarely possible, or only possible with considerable difficulty, to produce powders having average particle sizes of less than 0.5 $\mu m$ (microns).

A relatively effective technique for producing fine metal particles is atomization. Atomization involves the breakup of a liquid into small droplets, usually in a high-speed jet.

The preparation of high-quality powders, including aluminum, copper alloys, nickel alloys, cobalt alloys, zinc alloys and the like has been achieved by using the atomization technology. The breakup of a liquid stream by the impingement of high-pressure jets of water or gas is referred to as water or gas atomization, respectively. Other commonly used atomization techniques include centrifugal atomization, vacuum atomization, and ultrasonic atomization. By judiciously varying the parameters of the atomization process, the particle size, particle size distribution, particle shape, chemical composition and micro-structure of the particles can be varied to meet the requirements of a specific application.

The major components of a typical atomization system include a melting chamber (including a crucible, a heating device, and a melt-guiding pipe) in a vacuum or protective gas atmosphere, an atomizing nozzle and chamber, and powder-drying (for water atomization) or cooling equipment. The metal melt can be poured into first end of a guiding pipe having a second end with a discharging nozzle. The nozzle, normally located at the base of the pipe, controls the shape and size of the metal melt stream and directs it into an atomizing chamber in which the metal stream (normally a continuous stream) is disintegrated into fine droplets by the high-speed atomizing medium, either gas or water. Liquid droplets cool and solidify as they settle down to the bottom of the atomizing chamber. This chamber may be purged with an inert gas to minimize oxidation of the powder. A subsequent collector system may be used to facilitate the separation (from the waste gas) and collection of powder particles.

Powder producing processes using an atomizing nozzle are well known in the art: e.g., U.S. Pat. Nos. 5,125,574 (Jun. 30, 1992 to Anderson, et al.), 3,988,084 (Oct. 26, 1976 to Esposito, et al.), 5,656,061 (Aug. 12, 1997 to Miller, et al.), 4,585,473 (Apr. 29, 1986 to Narasimhan, et al.), and 4,793,853 (Dec. 27, 1988 to Kale).

When a stream of metal melt is broken up into small droplets, the total surface energy of the melt increases. This is due to the fact that the creation of a droplet necessarily generates a new surface and every surface has an intrinsic surface tension. When droplets are broken down into even smaller droplets, the total surface area of the droplets is further increased, given the same volume of material. This implies that a greater amount of energy must be consumed in creating this greater amount of surface area. Where does this energy come from? An atomizer works by transferring a portion of the kinetic energy of a high-speed atomizing medium to the fine liquid droplets. Because of the recognition that the kinetic energy (K.E.) of a medium with a mass m and velocity v is given by $K.E.=\frac{1}{2}m v^2$, prior-art atomization technologies have emphasized the importance of raising the velocity of the atomizing medium when exiting an atomizing nozzle. In an industrial-scale atomizer jet nozzle, the maximum velocity of a jetting medium is limited, typically from 60 feet/sec to supersonic velocities. The latter high speeds can only be achieved with great difficulties, by using heavy and expensive specialty equipment. In most of the cases, low atomizing medium speeds led to excessively large powder particles (micron sizes or larger).

The effect of temperature on the surface tension of metal melt droplets has been largely overlooked in the prior-art atomization technologies. Hitherto, the metal melts to be atomized for the purpose of producing fine metal powders have been typically super-heated to a temperature higher than the corresponding melting point by an amount of 70 to 300° C. (135 to 572° F); e.g., as indicated in U.S. Pat. No. 5,863,618 (Jan. 26, 1999) issued to Jarosinsky, et al. It is important to recognize that the higher the metal melt temperature is the lower its surface tension. A metal melt at a temperature near its vaporization point has a critically small surface tension (almost zero). This implies that a highly super-heated metal melt can be readily atomized to nanometer-scaled droplets without requiring a high atomizing medium speed. Prior-art technologies have not taken advantage of this important feature. In actuality, it is extremely difficult, if not impossible, for prior-art atomization techniques to make use of this feature for several reasons. Firstly, the vaporization temperature of a metal is typically higher than its melting temperature by one to three thousands of degrees K. The metal melt has to be super-heated to an extremely high temperature to reach a state of very low surface tension. In a traditional atomization apparatus, it is difficult to heat a bulk quantity of metal in a crucible above a temperature higher than 3,500° C. (3,773° K.), even with induction heating. Second, in a traditional atomization apparatus, the metal melt must be maintained at such a high temperature for an extended period of time prior to being introduced into an atomizer chamber. This requirement presents a great challenge as far as protection of the metal melt against oxidation (prior to atomization) is concerned since oxidation rate is extremely high at such an elevated temperature. Third, such a high-temperature metal melt would have a great tendency to create severe erosion to the wall of the melt-guiding pipe through which the melt is introduced into an atomizer chamber. Very few materials, if any, will be able to withstand a temperature higher than 5,500° C., for example, to be selected as a guiding pipe for refractory metal melt such as tungsten and tantalum. Fourth, the operations of pouring and replenishing a crucible with metal melt implies that the traditional atomization can only be a batch process, not a continuous process and, hence, with a limited production rate.

Further, melt atomization has been employed to produce ultra fine metallic powders, but rarely for producing ceramic powders directly. This is largely due to the fact that ceramic materials such as oxides and carbides have much higher melting temperatures as compared to their metal counterparts and require ultra-high temperature melting facilities. Therefore, ultra fine ceramic particles are usually produced by firstly preparing ultra fine base metal particles, which are then converted to the desired ceramics by a subsequent step of oxidation, carbonization, and nitride formation, etc. These multiple-step processes are tedious and expensive. In solution or sol-gel type processes, atomization of precursor solutions to ceramics requires an additional step of solvent removal. Furthermore, the production rates of these processes are relatively low and the final products are expensive.

Accordingly, one object of the present invention is to provide an improved process and apparatus for producing ultra fine metal and ceramic powder materials at the nanometer-scale. The process and apparatus make use of the concepts of a more effective particle kinetic energy transfer and reduced surface tension.

Another object of the present invention is to provide a process and apparatus for producing a wide range of ultra fine metal and ceramic powder materials at a high production rate.

A further object of the present invention is to provide a process and apparatus for producing a mixture of ultra fine ceramic powder materials which are well mixed and well dispersed at a predetermined proportion.

SUMMARY OF THE INVENTION

A preferred embodiment of the present invention entails a two-stage process for producing nanometer-scaled metal and ceramic powders. In the first stage, the process begins with super-heating a molten metal (either a pure metal or metal alloy) to an ultra-high temperature (e.g., higher than its melting point by 1,000 to 3,000° K.) and breaking up (atomizing) the melt into fine liquid droplets. This stream of highly super-heated metal melt droplets is then introduced into a second-stage atomizer chamber where these fine droplets are further broken up into nanometer-sized droplets by a more effective atomizer. This second-stage atomizer preferably comprises a vortex jet nozzle that receives a pressurized atomizing fluid medium from a fluid medium supplier (e.g., a compressed gas cylinder) and discharges the fluid medium through an outlet (an orifice or a multiplicity of orifices) into the atomizer chamber. This outlet is preferably annular in shape and engulfing the perimeter of the stream of super-heated metal melt droplets, i.e., coaxial with the droplet stream. When the stream of metal melt droplets are supplied into the atomizer chamber, the pressurized fluid medium, also referred to as the atomizing medium, is introduced through the jet nozzle to impinge upon the stream of super-heated metal droplets to further atomize the melt droplets into nanometer sizes. These nanometer-sized droplets are then rapidly cooled and collected as solid powders.

The first-stage heating and atomizing means preferably includes a thermal spray device selected from the group consisting of an arc spray device, a plasma spray device, a gas combustion spray device, an induction heating spray device, a laser-assisted spray device, and combinations thereof. Further preferably, the thermal spray device is a twin-wire arc spray device. The twin-wire arc spray process, originally designed for the purpose of spray coating, can be adapted for providing a continuous stream of super-heated metal melt droplets. This is a low-cost process that is capable of readily heating up the metal wire to a temperature as high as 6,000° C. A pressurized carrier gas is introduced to break up the metal melt into fine droplets, typically 5–200 µm in diameter. In an electric arc, the metal is rapidly heated to an ultra-high temperature and is broken up essentially instantaneously. The duration of time for the metal to stay at a super-heated temperature prior to be atomized at the second-stage is very short, thereby effectively alleviating the potential problem of undesired oxidation. Since the wires can be continuously fed into the arc-forming zone, the arc spray is a continuous process, which means a high production rate of ultra-fine powders.

During the first-stage, the super-heated metal liquid droplets are preferably heated to a temperature at least two times the melting point of the metal when expressed in terms of degrees Kelvin. Further preferably, the super-heated metal liquid droplets are at a temperature that lies between two times and 3.5 times the melting point of the metal when expressed in terms of degrees Kelvin. This could mean a temperature as high as 6,000° C. to ensure that the metal melt has a very small surface tension. This is readily achieved by using a thermal spray nozzle in the practice of the present invention. In contrast, in a prior-art atomizer system, it is difficult to use a furnace or induction generator to heat a crucible of metal to a temperature higher than 2,500° C.

The presently invented process is applicable to essentially all metallic materials, including pure metals and metal alloys. When high service temperatures are not required, the metal may be selected from the low melting point group consisting of bismuth, cadmium, cesium, gallium, indium, lead, lithium, rubidium, selenium, tellurium, tin, and zinc. When a high service temperature is required, a metallic element may be selected from the high-melting refractory group consisting of tungsten, molybdenum, tantalum, hafnium and niobium. Other metals with intermediate melting points such as copper, zinc, aluminum, iron, nickel and cobalt may also be selected.

In the second-stage atomizing device, the atomizing fluid medium may include water to achieve water atomization. Gas atomization is preferred, however. Preferably, the jet nozzle in a gas atomization device is a vortex jet nozzle for a more efficient atomization action. Preferably the atomizing fluid medium includes a gas selected from the group consisting of argon, helium, hydrogen, oxygen, carbon, nitrogen, chlorine, fluorine, boron, sulfur, and combinations thereof. Argon and helium are noble gases and can be used as a purely atomizing gas (without involving any chemical reaction) to produce fine metal powders. The other gases may be used to react with the metal melt to form ceramic powders of hydride, oxide, carbide, nitride, chloride, fluoride, boride, and sulfide, respectively.

Specifically, if the atomizing fluid medium contains a reactive gas (e.g., oxygen), this reactive gas will also rapidly react with the super-heated metal melt (in the form of fine droplets) to form nanometer-sized ceramic particles (e.g., oxides). If the atomizing fluid contains a mixture of two or more reactive gases (e.g., oxygen and nitrogen), the resulting product will contain a mixture of oxide and nitride). If the metal melt is a metal alloy or mixture (e.g., containing both indium and tin elements) and the reactive gas is oxygen, the resulting product will contain ultra-fine indium-tin oxide particles.

At the ultra-high temperature (1,000 to 3,000° K. above the metal melting point or 2.0 to 3.5 times of the melting point using absolute Kelvin scale), the surface tension of the metal melt is negligibly small and the liquid stream can be readily broken up into ultra-fine droplets. At such a high temperature, metal melt is normally capable of initiating a substantially spontaneous reaction with a reactant species (e.g., oxygen) contained in the atomizing medium of the second-stage atomizer device. In this case, the pressurized fluid not only possesses a sufficient kinetic energy to break up the metal melt stream into finely divided droplets, but also contains active reactant species to undergo a reaction with these fine metal droplets at high temperatures in a substantially spontaneous and self-sustaining fashion. The reaction heat released is effectively used to sustain the reactions in an already high temperature environment.

The process preferably further includes a step of collecting the cooled powder particles in a powder collector system composed of at least one cyclone and a device for separating exhaust gases from solid particles.

Still another preferred embodiment is an apparatus for producing single-component or multi-component nanometer-scaled powders. This apparatus is composed of three major component systems:

(1) a first-stage heating and atomizing means which includes (a) heating means for melting the metal and super-heating the metal melt to a temperature at least 1000 degrees Kelvin above the melting point of the metal; (b) atomizing means for breaking up the super-heated metal melt into fine liquid droplets;

(2) a second-stage atomizing means having (a) an atomizer chamber disposed a distance from the first-stage atomizing means for receiving the super-heated metal liquid droplets therefrom, (b) a supply of a pressurized fluid medium; and (c) a jet nozzle in flow communication with both the atomizer chamber and the pressurized fluid medium supply. The nozzle includes on one side an in-let pipe for receiving the fluid medium from the supply and on another side a discharge orifice of a predetermined size and shape or a multiplicity of orifices through which the pressurized fluid medium is dispensed into the atomizer chamber to impinge upon the super-heated metal liquid droplets for further breaking the liquid droplets down to being substantially nanometer-sized; and (3) cooling means in temperature-controlling relation to the atomizer chamber to facilitate solidification of the droplets therein and to keep the droplets from being agglomerated so that the droplets can be collected as nanometer-sized solid powders.

Advantages of the present invention may be summarized as follows:

1. A wide variety of nano-scaled metallic and ceramic particles can be readily produced. The starting metal materials can be selected from any element in the periodic table that is considered to be metallic. The corresponding partner gas reactants may be selected from the group of hydrogen, oxygen, carbon, nitrogen, chlorine, fluorine, boron, and sulfur to form respectively metal hydrides, oxides, carbides, nitrides, chlorides, fluorides, borides, and sulfides and combinations thereof. No known prior-art technique is so versatile in terms of readily producing so many different types of nano-scaled metallic and ceramic powders.

2. The presently invented process makes use of the concept that a metal melt, when super-heated to an ultra-high temperature (e.g., reaching 2 to 3.5 times its melting temperature in degrees K.) has a negligibly small surface tension so that a melt stream can be easily broken up into nano-scaled clusters or droplets without involving expensive or heavy atomizing nozzle equipment that is required to create an ultra-high medium speed. Prior-art atomization apparatus featuring a crucible for pouring metal melt into a melt-guiding pipe are not capable of reaching such a high super-heat temperature and/or making use of this low surface tension feature due to the four major reasons discussed earlier in the BACKGROUND section.

3. The metal melt can be an alloy of two or more elements which are uniformly dispersed. When broken up into nano-sized clusters, these elements remain uniformly dispersed and are capable of reacting with selected reactant species to form uniformly mixed ceramic powder particles. No post-fabrication mixing is necessary.

4. The near-zero surface tension also makes it possible to generate metal clusters of relatively uniform sizes, resulting in the formation of ceramic powders of a narrow particle size distribution.

5. The selected super-heat temperatures also fall into the range of temperatures within which a spontaneous reaction between a metallic element and a reactant gas such as oxygen can occur. The reaction heat released is automatically used to maintain the reacting medium in a sufficiently high temperature so that the reaction can be self-sustaining until completion. The reaction between a metal and certain gas reactant (e.g., oxygen) can rapidly produce a great amount of heat energy, which can be used to drive other reactions that occur concurrently or subsequently when other reactant elements (e.g., carbon or nitrogen) are introduced.

6. The process involves integration of super-heating, atomizing, and reacting steps into one single operation. This feature, in conjunction with the readily achieved super-heat conditions, makes the process fast and effective and now makes it possible to mass produce nano-sized ceramic powders cost-effectively.

7. The apparatus needed to carry out the invented process is simple and easy to operate. It does not require the utilization of heavy and expensive equipment. The over-all product costs are very low.

DETAILED DESCRIPTION OF PREFERRED EMBODIMENTS

A. Apparatus

Figure 1A:
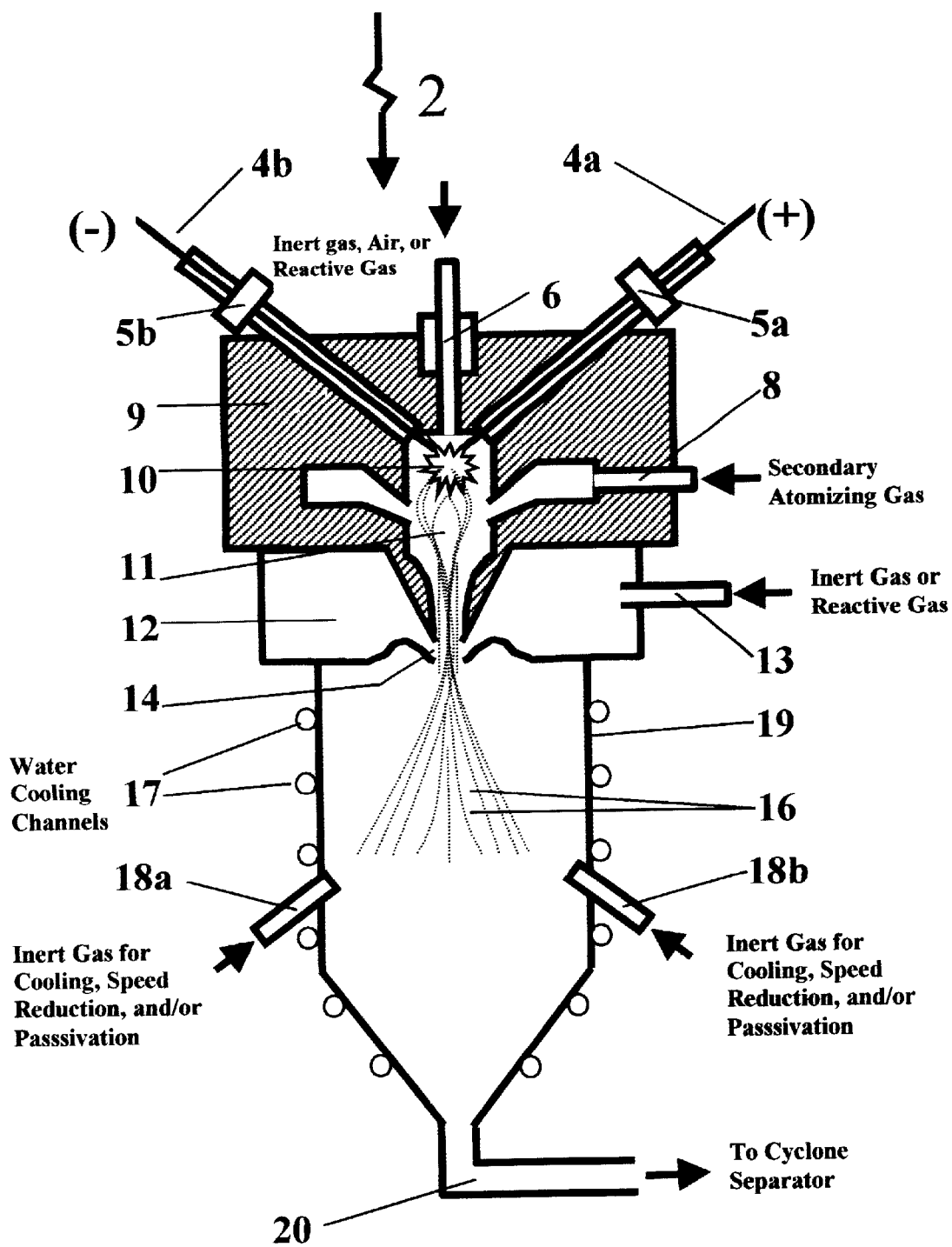
FIG. 1 (a) shows the schematic of a preferred embodiment of an apparatus for producing nanometer-sized metallic and ceramic powders and (b) a powder collector-separator system.

FIG. 1a schematically shows a two-stage atomization apparatus 2, in accordance with a preferred embodiment of the present invention, for producing nanometer-scaled powders. This apparatus includes three major functional component systems: (1) a first-stage heating and atomizing means, (2) a second stage atomizing means, and (3) powder formation facilitator means.

In the first-stage heating and atomizing means, there provided heating means for melting a metallic material (normally supplied in a wire, rod, or powder form) and for super-heating the metal melt to a temperature normally at least 1000 degrees Kelvin above the melting point of the metal. Also provided is an atomizing means for breaking up the super-heated metal melt into fine liquid droplets (smaller than 200 $\mu$m, preferably smaller than 20 $\mu$m in diameter). In a preferred embodiment of the presently invented apparatus, as indicated in FIG. 1a, the first-stage heating and atomizing means includes a twin-wire electric arc spray nozzle, which is mainly comprised of an electrically insulating block 9, two feed wires 4a, 4b, an atomizing gas passage means 6, and a secondary atomizing gas nozzle 8. The two metal wires 4a,4b are supplied with a DC voltage (one "+" and the other "−") or a pulsed power to form an arc 10 in an arc chamber 11. This arc 10, being at an ultra-high temperature (up to 6,000° C), functions to melt the wire tips and super-heat the resulting metal melt. A stream of atomizing/carrier gas passes through the passage means 6 into the arc chamber 11 to atomize the metal melt (breaking up the melt into fine liquid droplets) and to carry the stream of metal liquid droplets downward toward the second-stage atomizer chamber 19.

Figure 2A:
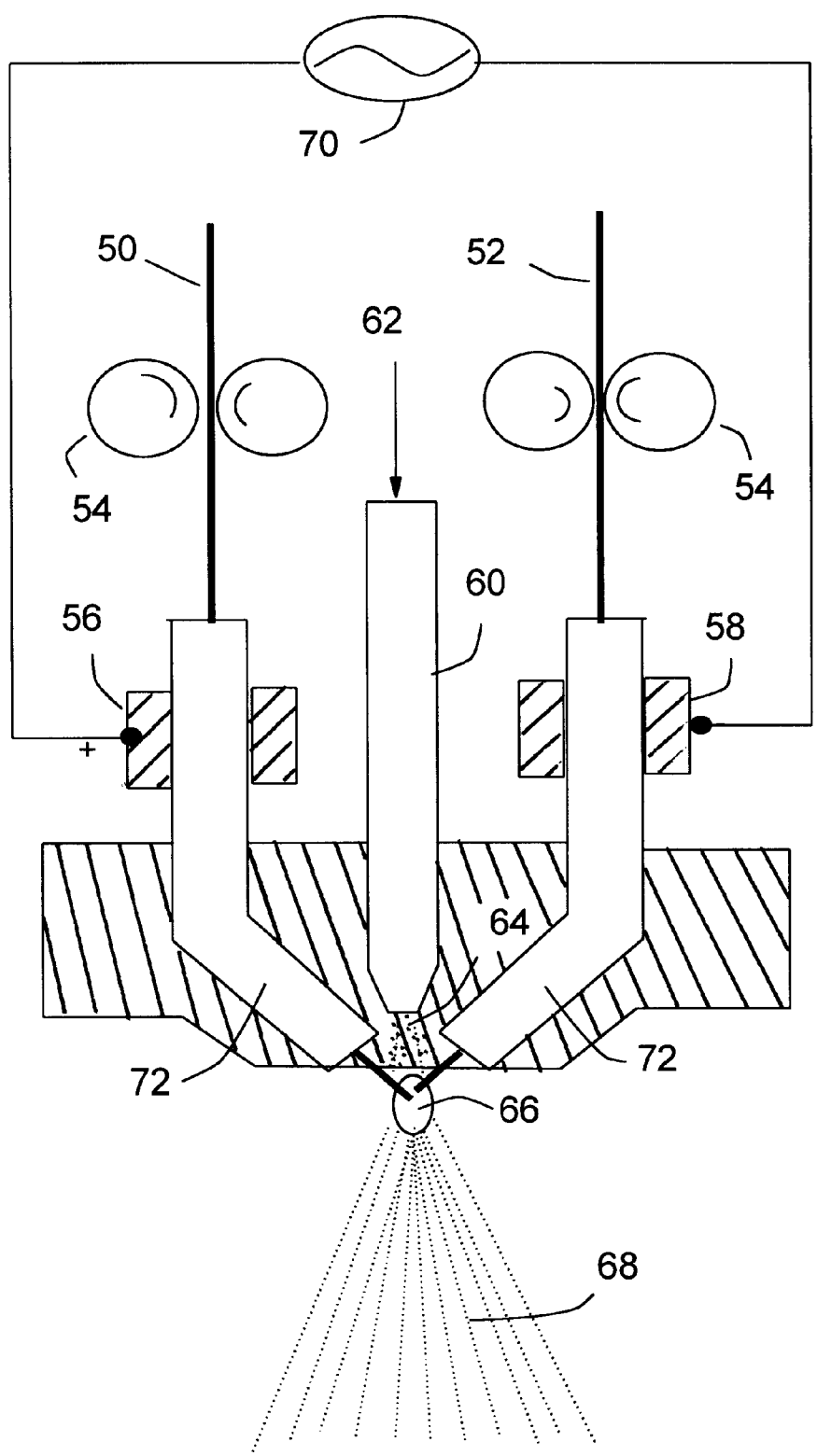
FIG. 2 schematically shows the working principle of an electric arc spray-based device for generating a stream of highly super-heated fine metal liquid droplets (two examples of the first-stage heating and atomizing means): (a) an open-style arc-spray nozzle and (b) a closed-style arc-spray nozzle in which the arc zone is enclosed by an air cap 76.

The two wires 4a,4b can be fed through air-tight means 5a,5b into the arc chamber 11, continuously or intermittently on demand, by a wire-feeding device (e.g., powered rollers 54 as indicated in FIG. 2a). An optional secondary atomizing gas nozzle 8 can be used to further break up the metal melt droplets, providing a stream of super-heated fine metal melt droplets into the second-stage atomizer chamber 19. The first-stage atomizing devices (including 6 and 8) are operated in such a fashion that they provide a stream of liquid droplets that are as highly super-heated and as finely divided as possible. However, the speed of the first-stage atomizing gas (from either 6 or 8) cannot be too high due to the fact that the gas comes in direct contact with the arc 10. Too high a gas speed in the first-stage could adversely affect the quality of the arc, e.g., may tend to diminish or extinct the arc. This is one of the reasons why a two-stage atomizing device is preferred over a single stage one.

The second-stage atomizing means has an atomizer chamber 19 positioned a distance from the first-stage atomizing means for receiving the super-heated metal liquid droplets therefrom. The second-stage atomizing means further includes a supply of a pressurized fluid medium (e.g., a compressed gas bottle, not shown) disposed a distance from the atomizer chamber and a jet nozzle 12 in flow communication with both the atomizer chamber 19 and the pressurized fluid medium supply. The jet nozzle 12 comprises on one side an in-let pipe 13 for receiving the fluid medium from the supply and on another side a discharge orifice 14 (an outlet that is either a single orifice of a predetermined size and shape or a multiplicity of orifices) through which the pressurized fluid medium is dispensed into the atomizer chamber 19 to impinge upon the super-heated metal liquid droplets for further breaking these liquid droplets 16 down to being nanometer-sized. The atomizing jet is preferably a more effective vortex jet nozzle.

The ultra-fine droplets 16 after second-stage atomization could remain in a liquid state or high-temperature solid state in which individual droplets could aggregate or stick together if left alone. It is therefore desirable to employ a solid powder formation facilitator means to help the droplets solidify and remain separated from one another. The powder facilitator means may include blowing a cooling medium (e.g., cool inert gas) through pipe means 18a,18b to impinge upon the atomized droplets 16. The cooling means may also include copper or steel tubing 17 or channels, containing cooling water, that are jacketed around the atomizer chamber 19 to facilitate solidification of the liquid droplets therein for forming solid powders. These powders, along with the residual atomizing gases and cooling gas are transferred through a conduit 20 to a powder collector/separator system (FIG. 1b)

Figure 1B:
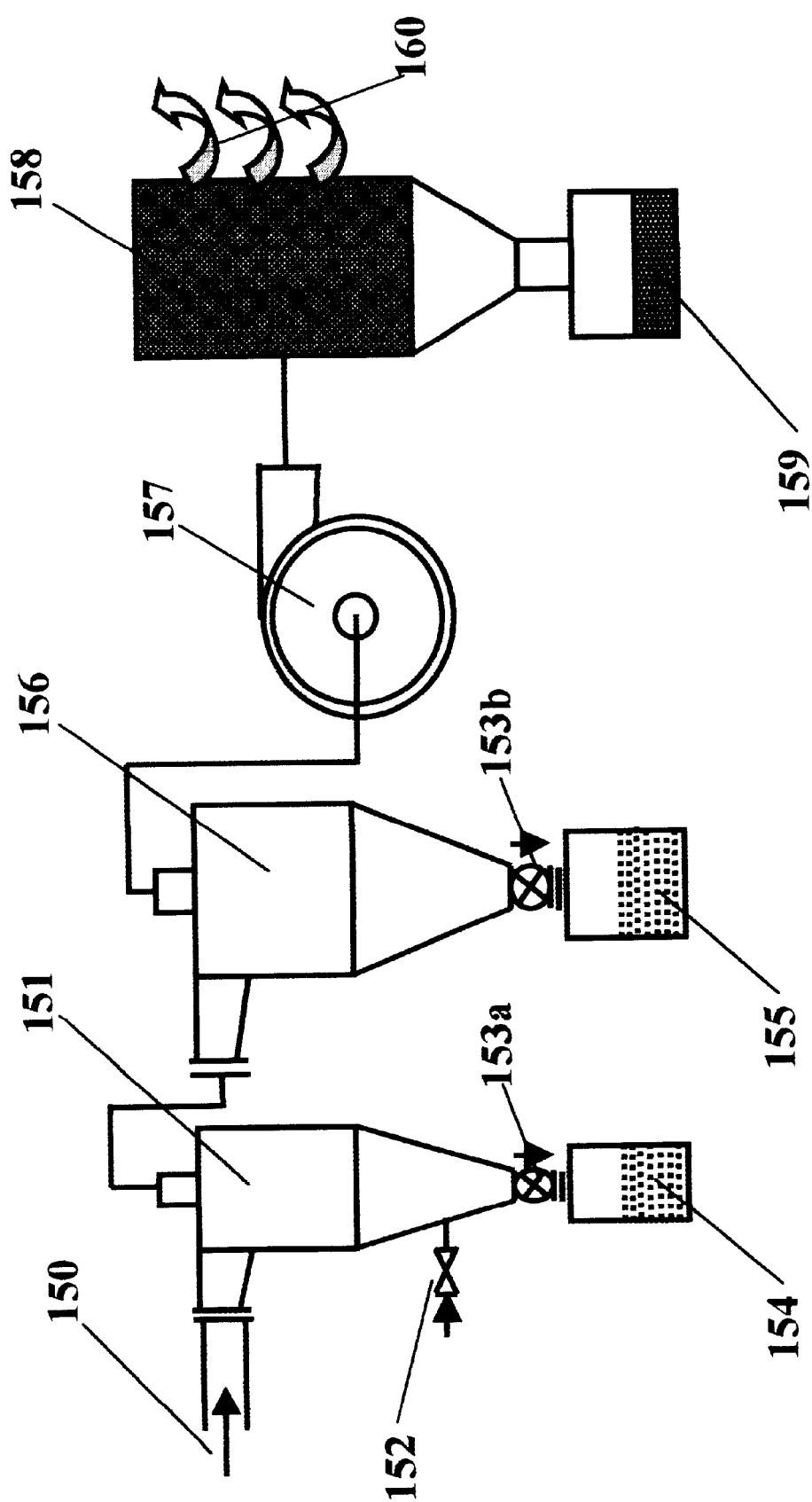

As schematically shown in FIG. 1b, the powder-gas mixture effluent 150 transferred from the conduit 20 (FIG. 1a) flows into the chamber of a cyclone or vortex powder classifier 151, which is provided with a reverse flow 152 capability. With a feeder valve 153a being open, the coarse particles are collected in container 154. Finer particles along with the residual gas are fed into the chamber of another cyclone 156 which collects fine particles through a valve 153b into a container 155. The residual ultra-fine particles and gas are conveyed by a blower 157 into a dust collector which has a container 159 to collect the dusts (ultra-fine powders), allowing the clean air 160 to exhaust out.

The twin-wire arc spray nozzle is but one of the many devices that can be used as a first-stage heating and atomizing means. Other types of thermal spray devices that can be used in the practice of the present invention include a plasma spray device, a gas combustion spray device, an induction heating spray device, a laser-assisted spray device, and combinations thereof. An electric arc spray nozzle, particularly a twin-wire arc spray nozzle, is a preferred choice, however. The twin-wire arc spray nozzle, originally developed for use in a spray coating process, can be adapted for providing a continuous stream of super-heated metal melt droplets. This low-cost process is capable of readily heating up the metal wire to a temperature as high as 6,000° C. and is further illustrated in FIG. 2a and 2b.

Schematically shown in FIG. 2a is an open-style twin-wire arc spray nozzle. Two metal wires 50,52 are driven by powered rollers 54 to come in physical contact with two respective conductive jackets 72 which are supplied with "+" and "−" voltage or pulsed power through electrically conductive blocks 56 and 58, respectively. The voltage polarity may be reversed; i.e., "−" and "+" instead of "+" and "−". The voltages come from a DC or pulsed power source 70. The lower ends of the two wires approach each other at an angle of approximately 30–60°. The two ends are brought to contact each other for a very brief period of time. Such a "short circuit" contact creates an ultra-high temperature due to a high current density, leading to the formation of an arc 66. A stable arc can be maintained provided that the voltage is constantly supplied, a certain level of gas pressure is maintained, and the wires are fed at a constant or pulsating speed. A stream 64 of compressed air, introduced through a gas passage 60 from a gas source 62 (e.g., compressed air bottle, not shown), serves to break up the melt produced inside the arc zone 66 to become finely divided metal melt droplets 68, which remain highly super-heated (i.e., at a temperature much higher than the melting point of the metal, typically by at least 1,000° in Kelvin scale).

Figure 2B:
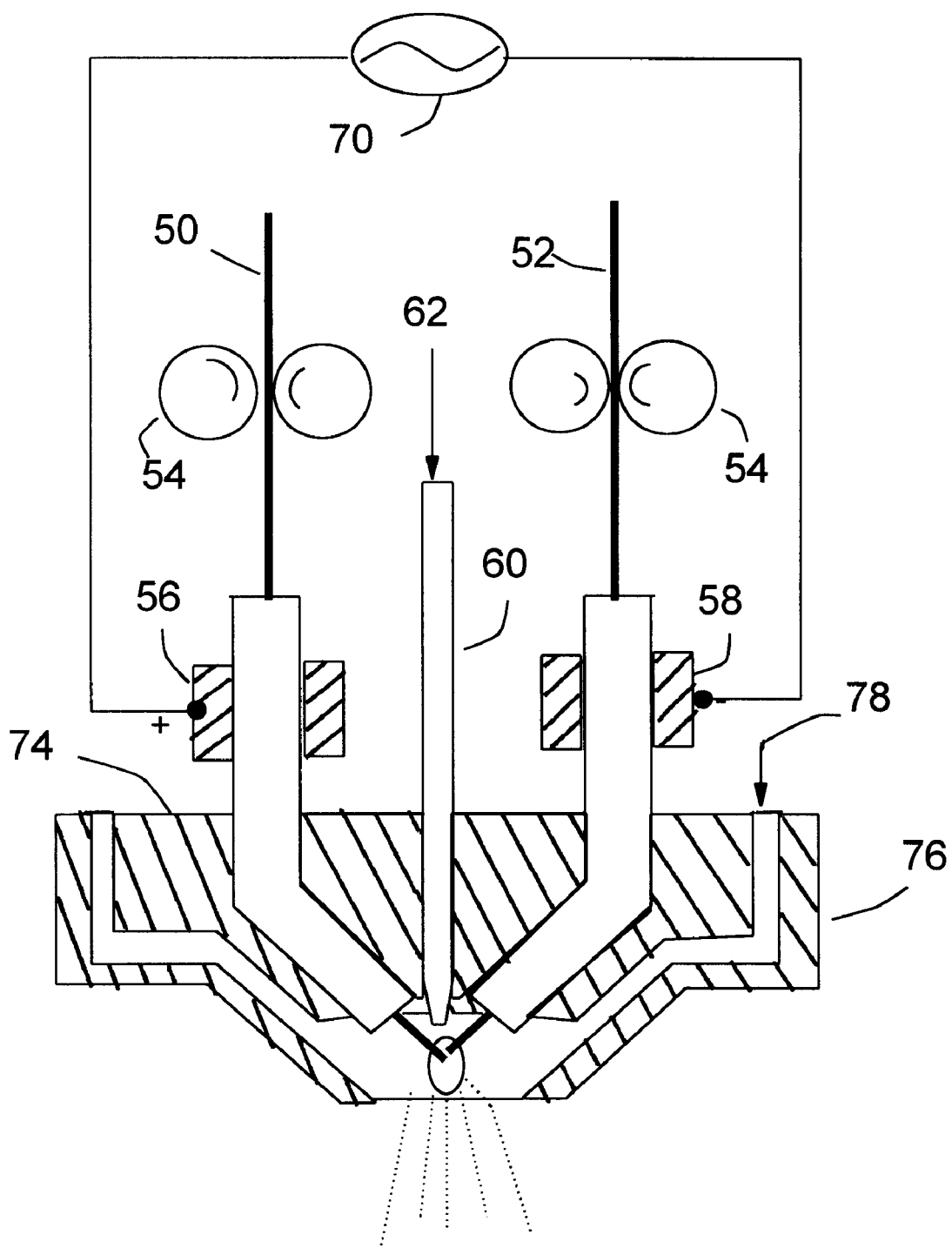

The metal melt droplets produced by the above-described open-style twin-wire arc spray nozzle tend to be high in diameter (typically 200 $\mu$m). An improved version is a closed-style arc spray nozzle as schematically shown in FIG. 2b. In this spray arc nozzle, the arc zone is enclosed by an air cap 76 and additional compressed gas or air (referred to as the secondary atomizing gas) is introduced (e.g., from 78) into the arc zone to compress the arc. The increased arc zone pressure effectively increases the atomizing speed and the arc temperature, thereby promoting the more efficient atomization resulting in much finer liquid droplets (typically less than 50 $\mu$m and often less than 10 $\mu$m in diameter). These super-heated fine liquid droplets (e.g., 82 in FIG. 4a) are then carried into the atomizer chamber of a second-stage atomizer device for further size reduction.

Figure 3:
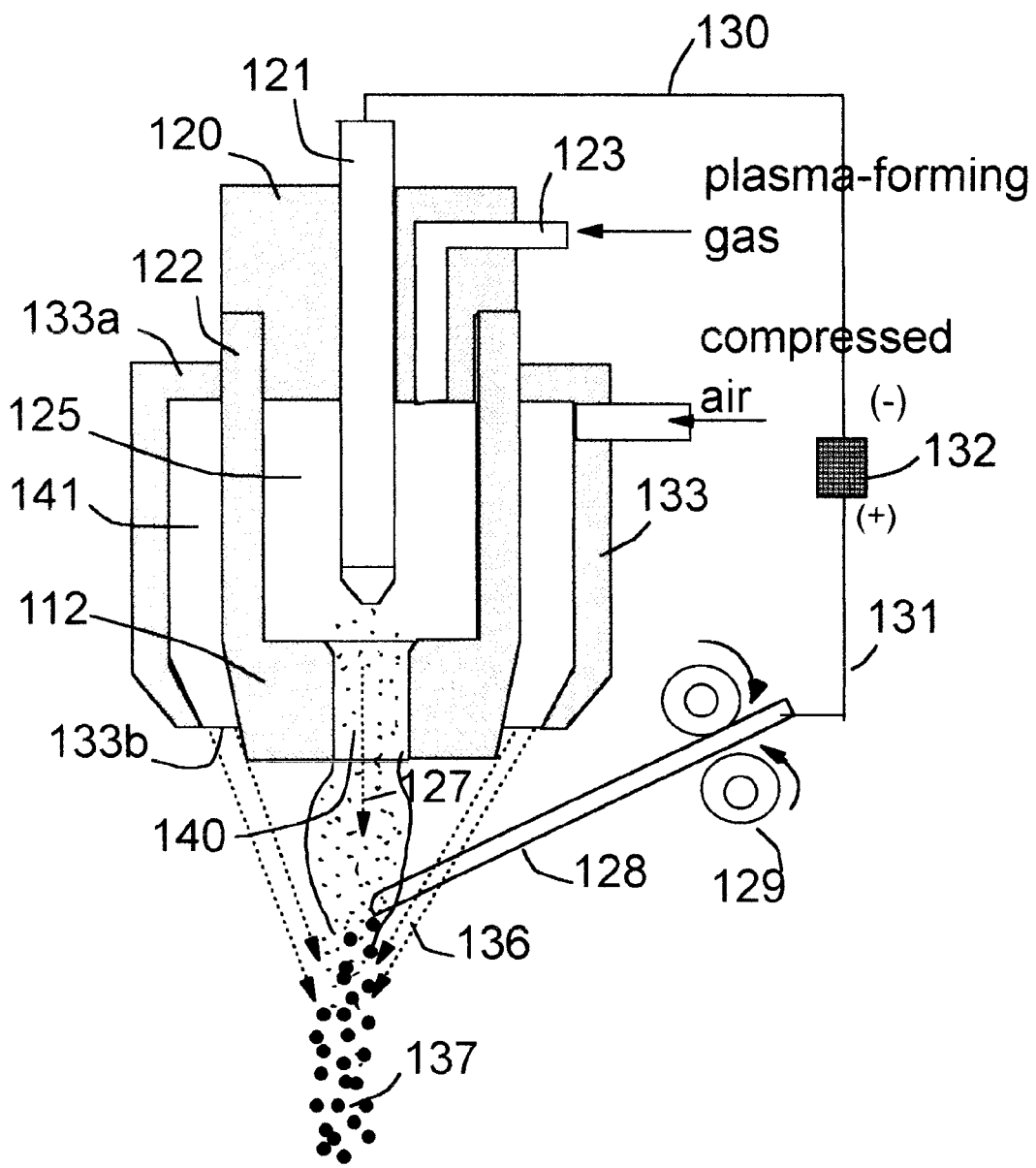
FIG. 3 a plasma spray nozzle as another example of the first-stage heating and atomizing means.

Other types of thermal spray devices that can be used in the present invention include a plasma arc spray nozzle. FIG. 3 shows an example of a plasma spray nozzle that involves feeding a wire 128 of metal (or metal powders) into the transferred arc 127 which rapidly fuses the metal for atomization. A large secondary flow of compressed air functions to atomize the molten metal into fine super-heated droplets. This plasma arc spray nozzle is comprised of the following major elements. An electrode 121 is mounted coaxially within an electrically insulating block 120 at one end of a cylindrical metal body 122, the opposite end of the body 122 is closed off by an end wall 112, provided with an axial bore forming a nozzle orifice 140. The electrode 121 is coaxial with the nozzle passage or bore, and within an annular chamber 125. A plasma-forming gas is introduced through a tube 123 to chamber 125, where the plasma-forming gas passes into and through the nozzle orifice 140. Concentrically surrounding the body 122 is a cup-shaped member 133, forming an annular space 141 between the cup-shaped member 133 and the cylindrical body 122. One end of the cup-shaped body 133 is closed off by end wall 133a, while its opposite end 133b is open. Compressed air is introduced through a tube into the annular space 141 for discharge through the open end of the cup-shaped member 133 to form a high-speed air flow 136, which functions to atomize the metal fed into the plasma arc (arc column being indicated by 127). The wire 128 is fed into the developed arc 127 by powered rollers 129 which rotate in the direction of the arrows to feed the wire. An electric potential difference is developed between the wire 128, an anode, and the electrode 121, a cathode, from a DC electric source 132 via leads 130,131 coupled respectively to the cathode 121 and the anode wire 128. The ultra-high temperature in the plasma arc (typically between 2,000° K. and as high as 32,000° K.) rapidly melts out and highly super-heat the metal, which is instantaneously atomized by the air flow 136.

Figure 4A:
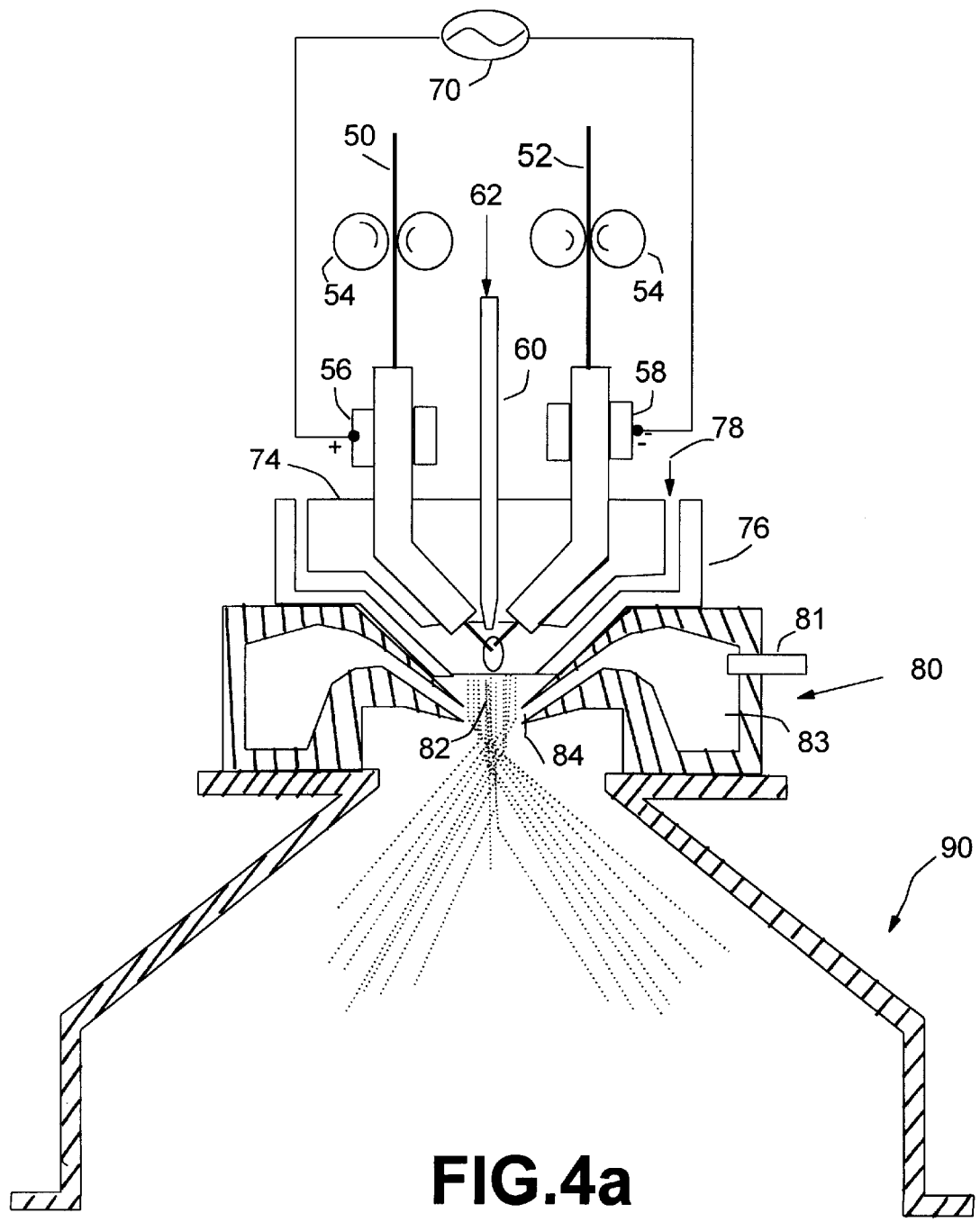
FIG. 4 (a) schematically shows the upper portion of a two-stage atomizing apparatus, (b) same as in (a) with the atomization chamber 90 and cooling channels 92 indicated, and (c) same as in (b) with a powder collector chamber 94, one cyclone 98, and a wet scrubber 100 being indicated.
Figure 4B:
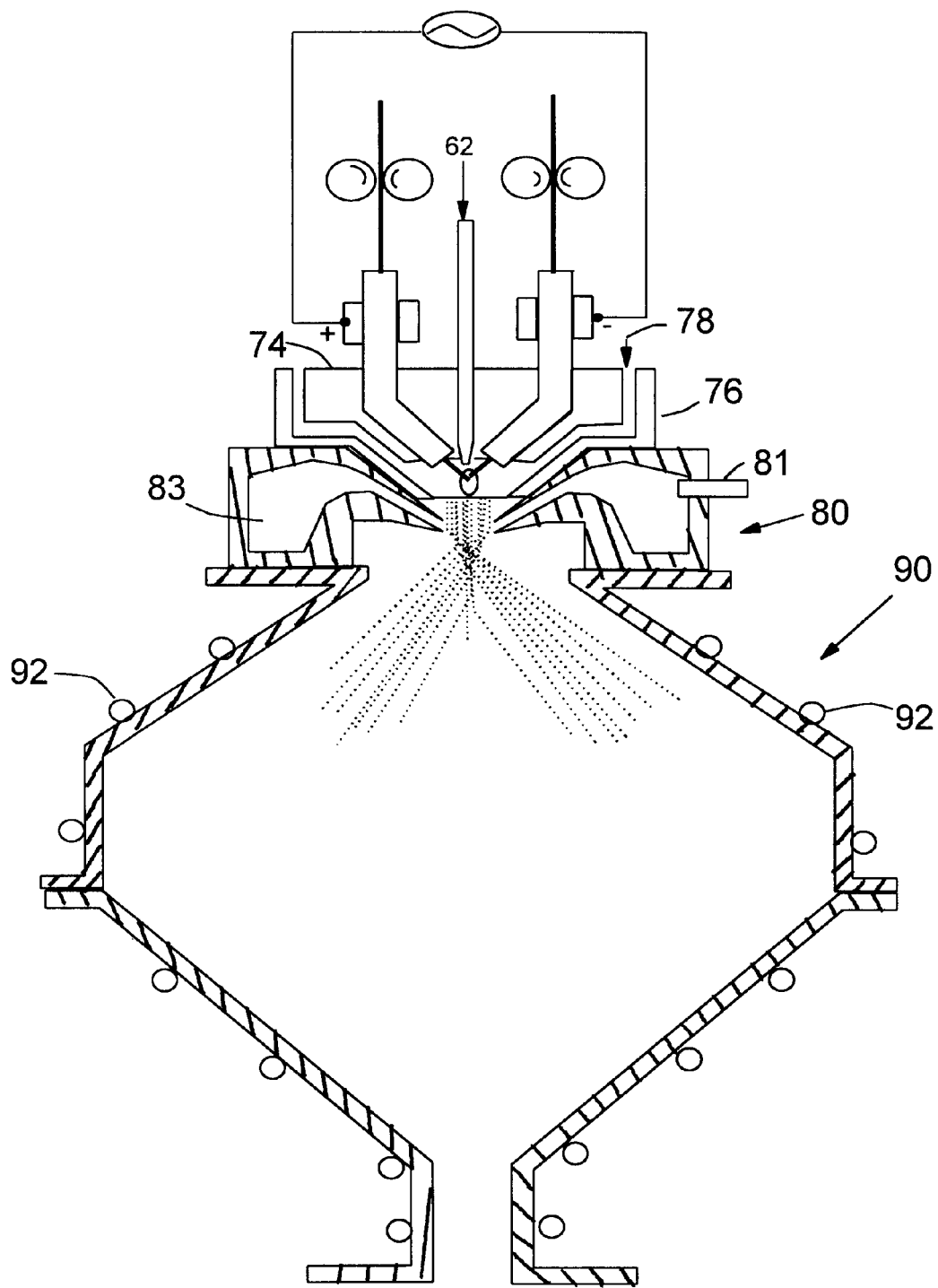

In FIG. 4a, the second-stage atomizer device is for receiving a super-heated stream of metal melt droplets 82 from the up-stream first-stage heating and atomizing means discussed earlier. This second-stage atomizer device comprises a jet nozzle 80 having on one side inlet pipe means 81 for receiving the atomizing fluid medium from a fluid source (e.g., compressed gas bottle, not shown), and on another side a discharge orifice 84 of a predetermined size and shape through which the atomizing fluid is dispensed to impinge upon the stream of super-heated metal melt droplets 82. Preferably, as shown in FIG. 4a and 4b, the nozzle discharge orifice 84 is annular in shape and coaxial with the stream of metal melt droplets 82. The orifice outlet 84 is oriented in such a fashion that the pressurized fluid (e.g., oxygen gas), immediately upon discharge from the orifice, impinges upon the super-heated metal melt stream. It may be noted that, if the atomizing gas coming out of the orifice 84 contains a reactive gas such as oxygen, the highly super-heated metal droplets can quickly react with oxygen to form oxide particles. Since the oxidation of a metal is normally a highly exothermic process, a great amount of reaction heat is released which can in turn be used to activate, maintain, or accelerate the oxidation reactions of other metal droplets. Such a self-sustaining reaction rapidly converts the liquid droplets into ceramic particles.

As a preferred embodiment, the jet nozzle may be a vortex-loop-slot jet nozzle for a more efficient atomization action. A pressurized gas may be introduced from a compressed air source through one or more inlet pipes (e.g., 81) into a vortex chamber 83 in which the gas molecules swirl around several circles before finally entering the annular slit leading to the orifice 84. This configuration allows the pressurized fluid (the atomizing medium) to effectively transfer the kinetic energy of the high speed fluid molecules to the stream of liquid metal droplets 82. A variety of atomizing nozzle configurations are available in the prior art. Examples include those disclosed in U.S. Pat. No. 5,656,061 (Aug. 12, 1997 to Miller, et al.), U.S. Pat. No. 5,125,574 (Jun. 30, 1992 to Anderson, et al.), U.S. Pat. No. 4,585,473 (Apr. 29, 1986 to Narasimhan, et al.), U.S. Pat. No. 4,793,853 (Dec. 27, 1988 to Kale), and U.S. Pat. No. 3,988,084 (Oct. 26, 1976 to Esposito, et al.).

Figure 4C:
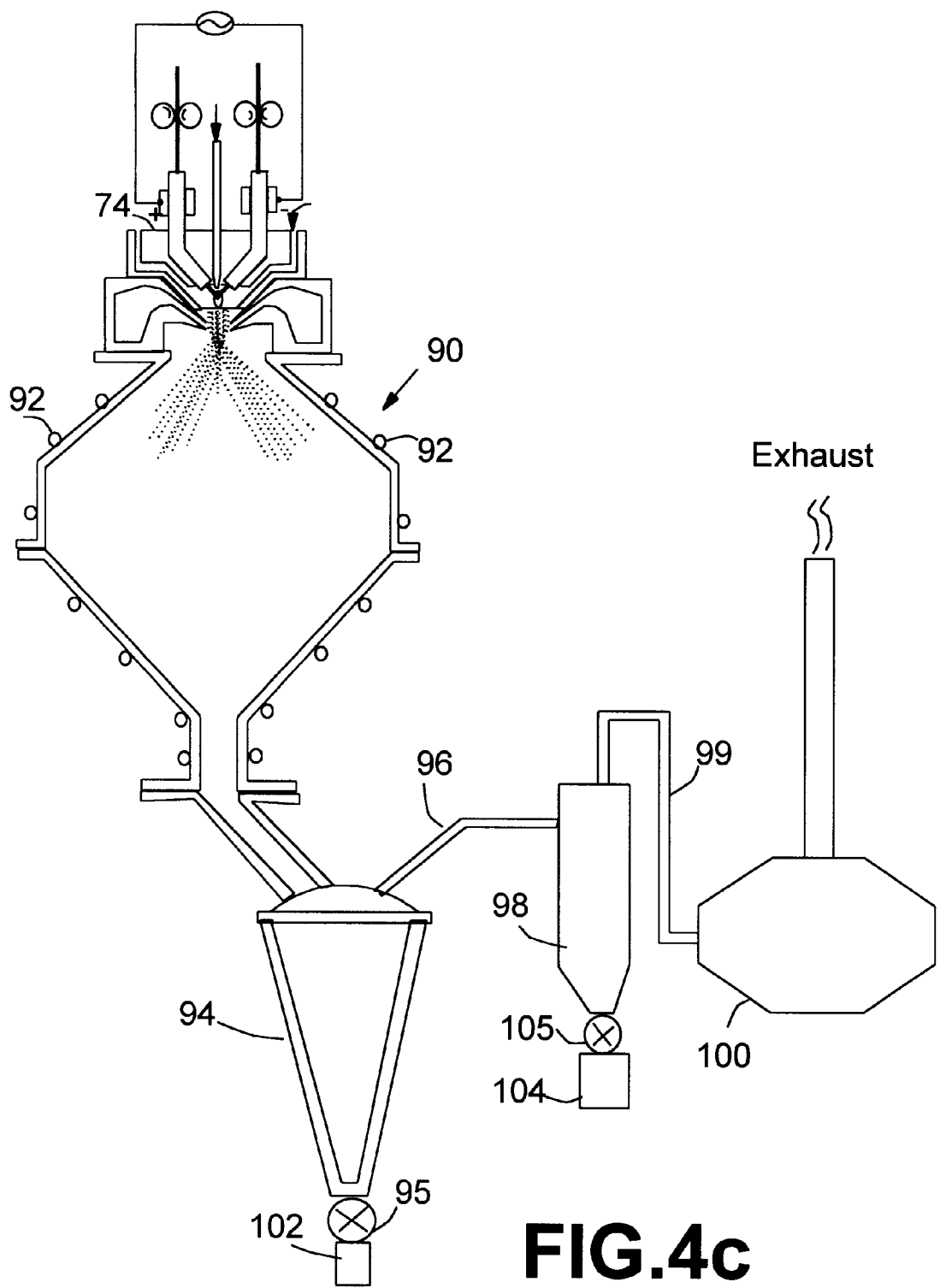

This atomizer chamber is preferably further connected to a powder collector and separator system, as shown in FIG. 4c. As an example, the atomizer chamber 90 is connected to a collector chamber 94, commonly referred to as an expansion chamber. The lower part of this expansion chamber 94 has an outlet being communicated to a removable powder collection container 102 through a valve 95. The valve 95 is open during atomization of the melt so that powder separated and collected by the chamber 94 can be received and collected in the container 102. The expansion chamber may be allowed to communicate through conduits 96,99 with a series of cyclones (only one cyclone 98 being shown) and a filter device (e.g., including a wet scrubber 100). The finely divided metallic or ceramic powder product is suspended in reaction product gases as well as excess atomizing gas, hereinafter collectively referred to as product fluids. The product fluids are removed from the atomizer chamber 90 through conduit 96,99 and introduced into cyclones 98 and filer/separator device, in order to separate the solid powder from the product fluids. The nano-sized particles are formed completely in the atomizer chamber and since the reactor effluent is rapidly cooled to below the powder forming temperatures substantially immediately, substantially no additional ceramic or metal solid formation or individual particle growth occurs outside the atomizer chamber.

A cyclone 98 is normally cooled (e.g., externally water chilled) to cool the powder product. As the product fluids travel through cyclones 98, the powder drops into receiver 104 with the valve 105 being open, while gaseous effluent leaves cyclone 98 through conduit 99 into a solid separation chamber (e.g., a wet scrubber 100). The wet scrubber can be a caustic water scrubber, containing packing of balls, saddles, etc. for greater contact. The scrubber separates the fine solid particles from the gas stream and possibly neutralizes acidic species therein before the gas is discharged to the atmosphere or to a flue. Any additional filtering device such as a bag filter, electrostatic precipitator or other equivalent means for separating suspended solids from a gas may be used. While only one cyclone and one solid separator are shown, more than two can be used. Alternatively, other types of powder collector and/or separator devices may be used. Solid powder collector and solid-gas separator systems are widely available in industry. Some examples are given in U.S. Pat. No. 4,662,909 (May 5, 1987 to Durr), U.S. Pat. No. 4,490,162 (Dec. 25, 1984 to Davis), and U.S. Pat. No. 4,282,195 (Aug. 4, 1981 to Hoekje).

B. Process

Another preferred embodiment of the present invention involves a two-stage process for producing nanometer-scaled metal and/or ceramic powders. Although parts or all of this process have been discussed in earlier sections, the most essential elements of this invented process will be recapitulated as follows:

In the first stage, again referring to FIGS. 1a and 1b, the process begins with super-heating a molten metal (either a pure metal or metal alloy, preferably in a wire or powder form) to an ultra-high temperature (e.g., higher than its melting point by preferably at least 1,000 to 3,000° K.) and breaking up (atomizing) the melt into fine liquid droplets. This stream of highly super-heated metal melt droplets, remaining at an ultra-high temperature even after the first-stage atomization, is then introduced into an atomizer chamber of a second-stage atomizer means. In this chamber, these highly super-heated fine droplets with an extremely low surface tension are further broken up into nanometer-sized droplets by a second-stage atomizer means. As described earlier, this second-stage atomizer means preferably comprises a vortex jet nozzle that receives a pressurized atomizing fluid medium from a fluid medium supplier (e.g., a compressed gas cylinder) and discharges the fluid medium through an outlet (an orifice or a multiplicity of orifices). This outlet is preferably annular in shape and engulfing the perimeter of the stream of super-heated metal melt droplets (i.e., coaxial with the stream) for a more efficient atomization.

When the stream of metal melt droplets are supplied into the second-stage atomizer chamber, the pressurized fluid medium (also referred to as the atomizing medium) is introduced through the jet nozzle to impinge upon the stream of super-heated metal droplets to further atomize the melt droplets into nanometer sizes. The jet nozzle (e.g., 14 in FIG. 1*a* or 84 in FIG. 4*a*) of this second-stage atomizer is oriented in such a fashion that the atomizing fluid medium will not come in direct contact with the arc. In such a configuration, the speed of the atomizing fluid medium would not be constrained by the risk of diminishing the arc and, therefore, can be much higher than the speed of the first-stage atomizing gas. This leads to a much more effective atomization. Further, if the second-stage atomizing fluid contains a highly reactive gas such as oxygen for the purpose of producing a ceramic powder, this atomizing fluid would not adversely affect the quality of the arc. This presents another advantage of a two-stage atomizing process over a single-stage one.

A powder formation facilitator means (e.g., 17,18*a*,18*b* in FIG. 1*a*) is then operated to rapidly cool the nanometer-sized droplets and maintain the droplets being separated from one another (to prevent inter-particle agglomeration or coalescence) so that these droplets can be collected as ultra-fine solid powders. This powder facilitator means may also include blowing into the atomizer chamber (e.g., through 18*a*,18*b*) a cooling gas that contains a small amount of passivation gas for forming a thin protective layer (e.g., thin oxide scale) on the particle surface to prevent undesirable oxidation. This passivation procedure is particularly useful in the cases where the liquid droplets after second-stage atomization remain to be an essentially metallic material, not ceramic. This passivation layer also functions to prevent otherwise metal droplets to stick together.

The first-stage heating and atomizing means preferably includes a thermal spray device such as an arc spray device (e.g., FIGS. 2*a* and 2*b*), a plasma spray device (e.g., FIG. 3), a gas combustion spray device, an induction heating spray device, and a laser-assisted spray device. Further preferably, the thermal spray device is a twin-wire arc spray device. A twin-wire arc spray nozzle is capable of readily heating up the metal wire to a temperature as high as 6,000° C. A pressurized carrier gas is introduced to break up the metal melt into fine droplets (typically 5 . 200 $\mu$m in diameter). In an electric arc, the metal is rapidly heated to an ultra-high temperature with a low surface tension and is broken up essentially instantaneously. The duration of time for the metal to stay at a super-heated temperature prior to be atomized at the second-stage is very short, thereby effectively alleviating the potential problem of undesired oxidation. If oxidation or other types of reactions (e.g., carbonization, nitride formation, etc.) are desired for the purpose of producing ceramic powders, these reactions can be deferred until the super-heated metal liquid droplets are carried into the second-stage atomizer chamber in which the atomizing gas contains reactive species such as oxygen, carbon, nitrogen, chlorine, etc. Since the wires can be continuously fed into the arc-forming zone, the arc spray is a continuous process, which means a high production rate of ultra-fine powders.

During the first-stage of the presently invented process, the super-heated metal liquid droplets are preferably heated to a temperature at least 2 times the melting point of the metal when expressed in terms of degrees Kelvin. Further preferably, the super-heated metal liquid droplets are at a temperature that lies between 2 times and 3.5 times the melting point of the metal when expressed in terms of degrees Kelvin. This would bring the liquid melt to a state of negligible surface tension.

It may be noted that the presently invented process is applicable to essentially all metallic materials, including pure metals and metal alloys. When high service temperatures are not required, the metal may be selected from the low melting point group consisting of bismuth, cadmium, cesium, gallium, indium, lead, lithium, rubidium, selenium, tellurium, tin, and zinc.

Table 1 shows the processing temperatures of these metallic elements.

TABLE 1

The melting point and super-heat temperature of selected low-melting metals.

| Metal | Melting Point (° K.) | Super-Heat Temperature (° K.) |
|---|---|---|
| Bismuth (Bi) | 544.4 | 1,280 |
| Cadmium (Cd) | 594 | 1,485 |
| Cesium (Cs) | 301.6 | 760 |
| Gallium (Ga) | 302.8 | 780 |
| Indium (In) | 429.6 | 1,480 |
| Lead (Pb) | 600.4 | 1,500 |
| Lthium (Li) | 453.7 | 1,140 |
| Rubidium (Rb) | 311.9 | 780 |
| Selenium (Se) | 490 | 1,225 |
| Tellurium (Te) | 722.5 | 1,806 |
| Tin (Sn) | 504.9 | 1,425 |
| Zinc (Zn) | 693 | 1,735 |

When a high service temperature is required, a metallic element may be selected from the high-melting refractory group consisting of tungsten, molybdenum, tantalum, hafnium and niobium. The liquid metal temperature is preferably at 4,000–6,500° C. for these refractory metals. Other metals with intermediate melting points such as copper, zinc, aluminum, iron, nickel and cobalt may also be selected, with metal melt temperature in the range of 3,000–5,000° C.

In the second-stage atomizing device, the atomizing fluid medium may include water to achieve water atomization, although gas atomization is preferred. Further preferably, the jet nozzle in a gas atomization device is a vortex jet nozzle for a more efficient atomization action. Preferably the atomizing fluid medium includes a gas selected from the group consisting of argon, helium, hydrogen, oxygen, carbon, nitrogen, chlorine, fluorine, boron, sulfur, and combinations thereof. Argon and helium are noble gases and can be used to produce fine metal powders. The other gases may be used to react with the metal melt to form ceramic powders of hydride, oxide, carbide, nitride, chloride, fluoride, boride, and sulfide, respectively.

Specifically, if the atomizing fluid medium contains a reactive gas (e.g., oxygen), this reactive gas will also rapidly react with the super-heated metal melt (in the form of fine droplets) to form nanometer-sized ceramic particles (e.g., oxides). If the atomizing fluid contains a mixture of two or more reactive gases (e.g., oxygen and nitrogen), the resulting product will contain a mixture of oxide and nitride). If the metal melt is a metal alloy or mixture (e.g., containing both indium and tin elements) and the reactive gas is oxygen, the resulting product will contain ultra-fine indium-tin oxide particles. This implies that the presently invented process is capable of producing single-component or multi-component powders, including mixtures of metal and ceramic powders.

At the ultra-high temperature (1,000 to 3,000° K. above the metal melting point or 2.0 to 3.5 times of the melting point using absolute Kelvin scale), the surface tension of the metal melt is negligibly small and the liquid stream can be readily broken up into ultra-fine droplets. Furthermore, at such a high temperature, metal melt is normally capable of initiating a substantially spontaneous reaction with a reactant species )e.g., oxygen) contained in the atomizing medium of the second-stage atomizer device. In this case, the pressurized fluid not only possesses a sufficient kinetic energy to break up the metal melt stream into finely divided droplets, but also contains active reactant species to undergo a reaction with these fine metal droplets at high temperatures in a substantially spontaneous and self-sustaining fashion. The reaction heat released is effectively used to sustain the reactions in an already high temperature environment.

The process preferably further includes a step of collecting the cooled powder particles in a powder collector system composed of at least one cyclone and a device for separating exhaust gases from solid particles. Further preferably, there are two or more cyclone-type collectors to classify the powders according to their sizes.

The presently invented process takes advantage of the principle that a metal melt, when super-heated to an ultra-high temperature (e.g., reaching 2 to 3.5 times its melting temperature in degrees K.) has a negligibly small surface tension so that a melt stream can be easily broken up into nano-scaled clusters or droplets. The breakup of a stream of liquid with an ultra-low surface tension can be easily achieved. As a matter of fact, it does not require any specialized, powerful atomizer. The present process, therefore, can be readily accomplished without necessarily involving expensive or heavy atomizing nozzle equipment designed for achieving an ultra-high medium speed. The near-zero surface tension also makes it possible to generate metal clusters of relatively uniform sizes, resulting in the formation of ceramic powders of a narrow particle size distribution.

The metal melt can be an alloy of two or more elements which are uniformly dispersed. When broken up into nano-sized clusters, these elements remain uniformly dispersed and are capable of reacting with selected reactant species to form uniformly mixed ceramic powder particles. No post-fabrication mixing is necessary.

The pressurizing reactant fluid can contain a gas, a liquid, or a solid. A solid reactant in fine powder form requires a carrier gas to carry it into the mixing atomizer device. An example is fine carbon powders suspended in either an inert gas (e.g., helium) or reactive gas (e.g., oxygen), depending upon the types of intended ceramic powders to be produced. In the former example, a metal carbide will be produced. The helium gas is used only as an atomizing medium. In the latter example, oxygen gas is used to atomize the metal melt and the resulting nano-scaled metal clusters react immediately with the oxygen molecules. If more than two reactant elements are used (e.g., carbon particles suspended in oxygen gas, or a mixture of CO and $O_2$), more complicated reactions can occur. Under favorable conditions, oxidation of a metal occurs, resulting in the release of a great amount of heat, which can be used to promote the reaction between a metal element (if still available) and carbon. The supply of a molten metal element and a mixture of two reactant gases can lead to the formation of a mixture of two ceramics.

If the production of a uniform mixture of ceramics from a metallic alloy is desired, this alloy can be introduced as two wires of identical composition into the twin-wire arc spray nozzle, as shown in FIG. 1a, 2a, or 2b. Alternatively, the two wires may be made up of different metal compositions. For example, a technologically important oxide mixture is indium-tin oxides. This product can be used in a flat panel display technology. In one instance, a tin wire and an indium wire were fed into an arc sprayer nozzle and super-heated to approximately 1,300° C. for two-stage atomization. In the second-stage atomization chamber, an oxygen flow at a rate of 200 scfm under a gas pressure of approximately 200 psi was used to atomize and react with the metal melt mixture. Ultra-fine indium-tin oxide particles with an average diameter of 50 μm were obtained. A production rate of 20 kilograms per hour was achieved with a lab-scale apparatus.

As another example, when a nickel chromium alloy super-heated to 1,900° C. is atomized by a carbon-containing gas stream at a pressure of approximately 500 psi, a ceramic-metal mixture product is obtained. The product contains some chromium carbide powders with a size range of 10 to 100 μm dispersed in un-reacted nickel-chromium powders. With a super-heat temperature of approximately 3,000° C., the same material composition, when atomized by the same gas stream at a reduced pressure of approximately 200 psi, a very different product is obtained. This latter product contains a larger amount of chromium carbide ceramic powders, some nickel oxide powders, and a very small amount of un-reacted nickel-chromium. The ceramic powders are mostly smaller than 1 μm in size and are relatively uniform in sizes. This observation further illustrates the importance of the reacting/atomizing temperature in regulating the particle size, size distribution, and compositions of product powders.

What is claimed:

1. A two-stage process for producing nanometer-scaled powders from a metal, said process comprising:
    (a) operating a first-stage heating and atomizing means to provide a stream of super-heated fine-sized metal liquid droplets into a chamber of a second-stage atomizing means, said second-stage atomizing means comprising a supply of an atomizing fluid medium;
    (b) operating said second-stage atomizing means by directing said atomizing fluid medium into said chamber to impinge upon said stream of super-heated metal liquid droplets to further break up said metal liquid droplets into substantially nanometer-sized particles; and
    (c) cooling and/or passivating said particles to form nanometer-scaled solid powders.

2. A process as set forth in claim 1, wherein said first-stage heating and atomizing means comprising a thermal spray device selected from the group consisting of an arc spray device, a plasma spray device, a gas combustion spray device, an induction heating spray device, a laser-assisted spray device, and combinations thereof.

3. A process as set forth in claim 2, wherein said thermal spray device comprising a twin-wire arc spray device.

4. A process as set forth in claim 1, wherein said super-heated metal liquid droplets are at a temperature at least two times the melting point of said metal when expressed in terms of degrees Kelvin.

5. A process as set forth in claim 1, wherein said super-heated metal liquid droplets are at a temperature that lies between two times and 3.5 times the melting point of said metal when expressed in terms of degrees Kelvin.

6. A process as set forth in claim 1, wherein said metal liquid droplets comprising at least one metallic element selected from the low melting point group consisting of bismuth, cadmium, cesium, gallium, indium, lead, lithium, rubidium, selenium, tellurium, tin, and zinc.

7. A process as set forth in claim 1, wherein said metal liquid droplets comprising at least one metallic element selected from the high-melting refractory metal group consisting of tungsten, molybdenum, tantalum, hafnium, and niobium.

8. A process as set forth in claim 1, wherein said atomizing fluid medium comprising water.

9. A process as set forth in claim 1, wherein said atomizing fluid medium comprising a gas selected from the group consisting of argon, helium, hydrogen, oxygen, carbon, nitrogen, chlorine, fluorine, boron, sulfur, and combinations thereof.

10. A process as set forth in claim 1, further comprising a step of collecting said cooled powder particles in a powder collector means comprising a cyclone.

11. A process as set forth in claim 1, further comprising a step of collecting said cooled powder particles wherein said particle collecting step comprises a step of separating exhaust gases from solid particles.

12. A process as set forth in claim 1, wherein said metal comprising an alloy of at least two elements.

13. A process as set forth in claim 1, wherein said atomizing fluid medium comprising a reactant gas selected from the element group of hydrogen, oxygen, carbon, nitrogen, chlorine, fluorine, boron, and sulfur and wherein step (b) further comprising allowing said reactant gas to react with said super-heated metal liquid droplets to form a nanometer-sized ceramic powder.

14. A process as set forth in claim 1, wherein said metal comprising an alloy of at least two metallic elements and said atomizing fluid medium comprising a reactant gas selected from the element group of hydrogen, oxygen, carbon, nitrogen, chlorine, fluorine, boron, and sulfur and wherein step (b) further comprising allowing said reactant gas to react with said metal liquid droplets to form a mixture of nanometer-sized ceramic powders.

15. A process as set forth in claim 1, wherein said atomizing fluid medium comprising at least two gaseous reactants selected from the element group of hydrogen, oxygen, carbon, nitrogen, chlorine, fluorine, boron, and sulfur and wherein step (b) further comprising allowing said gaseous reactants to react with said metal liquid droplets to form a mixture of nanometer-sized ceramic powders.

16. A process as set forth in claim 1, wherein said atomizing fluid medium comprising at least a reactant gas selected from the element group of hydrogen, oxygen, carbon, nitrogen, chlorine, and fluorine and wherein step (b) further comprising allowing said at least a reactant gas to react with said super-heated metal liquid droplets in such a manner that the reaction heat released is used to sustain said reaction until most of said metal droplets are substantially converted to nanometer-sized ceramic powders.

17. A process as set forth in claim 1, wherein at least 50% of said super-heated metal liquid droplets in step (a) are smaller than 200 $\mu$m in diameter.

18. A process as set forth in claim 1, wherein at least 50% of said super-heated metal liquid droplets in step (a) are smaller than 20 $\mu$m in diameter.

19. A process as set forth in claim 1, wherein said atomizing fluid medium is pre-heated to a predetermined temperature prior to being introduced to impinge upon said metal liquid droplets.

20. An apparatus for producing nanometer-scaled powders from a metal, said apparatus comprising
   (a) a first-stage heating and atomizing means, comprising
      heating means for melting said metal and super-heating said metal melt to a temperature at least 1000 degrees Kelvin above the melting point of said metal;
      atomizing means in atomizing relation to said metal melt for breaking up said super-heated metal melt into fine liquid droplets;
   (b) a second-stage atomizing means having an atomizer chamber disposed a distance from said first-stage atomizing means for receiving said super-heated metal liquid droplets therefrom, said second-stage atomizing means further comprising
      a supply of a pressurized fluid medium disposed a distance from said atomizer chamber;
      a jet nozzle in flow communication with both said atomizer chamber and said supply of a pressurized fluid medium; said nozzle comprising on one side in-let pipe means for receiving said fluid medium from said supply and on another side a discharge orifice of a predetermined size and shape or a multiplicity of orifices through which said pressurized fluid medium is dispensed into said atomizer chamber to impinge upon said super-heated metal liquid droplets for further breaking said liquid droplets down to being substantially nanometer-sized; and
   (c) cooling means in temperature-controlling relation to said atomizer chamber to facilitate solidification of said droplets therein for forming nanometer-sized solid powders.

21. An apparatus as set forth in claim 20, wherein said jet nozzle comprises a vortex jet nozzle.

22. An apparatus as set forth in claim 20, wherein said atomizer chamber is in flow communication with a powder collector system comprising at least a collector chamber and a powder filter device.

23. An apparatus as set forth in claim 22, wherein said powder collector system comprising at least one cyclone.

24. An apparatus as set forth in claim 20, wherein said first-stage heating and atomizing means comprising a thermal spray device selected from the group consisting of an arc spray device, a plasma spray device, a gas combustion spray device, an induction heating spray device, a laser-assisted spray device, and combinations thereof.

25. An apparatus as set forth in claim 24, wherein said thermal spray device comprising a twin-wire arc spray device.

* * * * *